April 17, 1962 H. W. MAURER 3,029,867

FOLDING PLIABLE PARTITION

Filed March 26, 1959 4 Sheets-Sheet 1

INVENTOR.
HERMAN W. MAURER

BY Elber J. Hyde

ATTORNEY

*INVENTOR.*
HERMAN W. MAURER

*BY* Elber J. Hyde

ATTORNEY

INVENTOR.
HERMAN W. MAURER
BY
Elver J. Hyde
ATTORNEY

April 17, 1962 H. W. MAURER 3,029,867

FOLDING PLIABLE PARTITION

Filed March 26, 1959

4 Sheets-Sheet 4

INVENTOR.
HERMAN W. MAURER

BY

Elm J. Hyde
ATTORNEY

United States Patent Office 3,029,867
Patented Apr. 17, 1962

3,029,867

FOLDING PLIABLE PARTITION

Herman W. Maurer, 3126 Scarborough Road, Cleveland Heights 18, Ohio

Filed Mar. 26, 1959, Ser. No. 802,148
9 Claims. (Cl. 160—84)

This invention pertains to folding pliable partitions for use in temporarily dividing large rooms into smaller ones.

In my previous Patents 1,460,597 and 2,027,992 I have shown and described two types of folding partitions in which collapsing frames in series constituted the folding mechanism for double rigid surfaces with an appreciable air space between.

The present invention has for its object improvements in the general construction and operation, and improved appearance during and after folding; and withal inexpensive manufacture, efficient easy operation, endurance against rough usage, and efficient sound separation, in a folding partition wherein the surfaces are pliable and are folded in an accordion-like manner.

Another object of this invention is the provision of a folding partition, which when extended, stretches the pliable surfaces taut, and folds them accordionwise during and after folding, without having numerous vertical rods or other flimsy construction extending from top to bottom, and which supplies maximum uniform air space between its outer pliable wall surfaces, thereby establishing a relatively lightweight folding partition, which will resist lateral impacts like kicking or falling against, without distorting any of its parts.

Still another object of this invention is the provision in a folding partition of a means at top and bottom, in each of a series of frames comprising the partition, and in conjunction with the top and bottom collapsing members of the frame; a criss-cross member which holds and supports the outer surface fabrics, hereinafter called pliable walls, in such a manner as to make all folds equal, and simultaneously folding, as well as uniform, top to bottom.

Still another object of this invention is to provide a system of horizontally activated hinged members to provide a better and adequate area support of pliable walls top and bottom, both when extended or during folding, which may be used in conjunction with or without criss-cross spacer supports; and when without, then directly and periodically, trolley supported to the track at the top, and with suspension means of lower from the top system; thus providing a folding partition of a different type than the prior art devices which utilized a series of collapsible frames and rigid surface materials.

For a better understanding of the present invention, together with other and further objects thereof, reference is had to the following description taken in connection with the accompanying drawings, and its scope will be pointed out in the appended claims.

With reference to the drawings—

FIGURE 4 is an enlarged sectional plan view of the middle portion of the first frame of FIGURE 2, showing the cantilever arm which is integral with the left collapsing member extending free over right collapsing member from the middle hinge point on.

Figure 13:
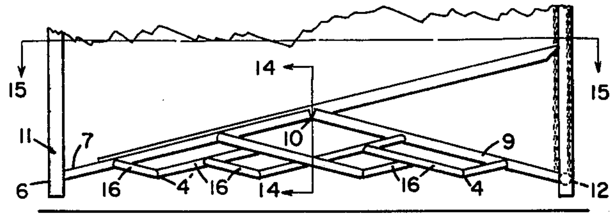
FIGURE 13 is an elevational view of the bottom criss-cross member of the frame, corresponding to FIGURE 11 of the top member, but showing four tie rod supports instead of two.
Figure 15:
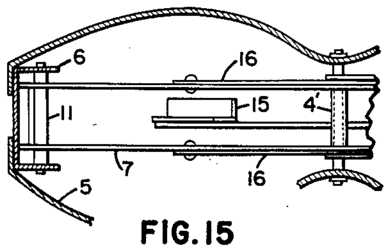
Figure 15A:
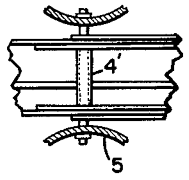
Figure 15B:
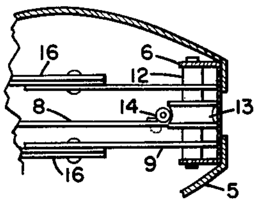

FIGURES 15, 15*a* and 15*b* are sectional plan views of portions of the frame taken along lines 15—15 of FIGURE 13, showing the left hand corner, an intermediate portion, and the right hand corner thereof; and showing walls folded as in partial collapsing of the frame.

Figure 16:
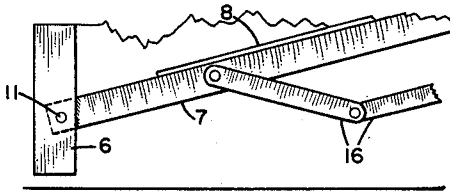
Figure 16A:
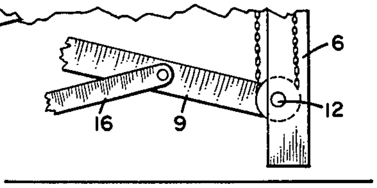

FIGURES 16 and 16*a* are elevational views of the portions shown in FIGURES 15 and 15*a*.

Figure 17:
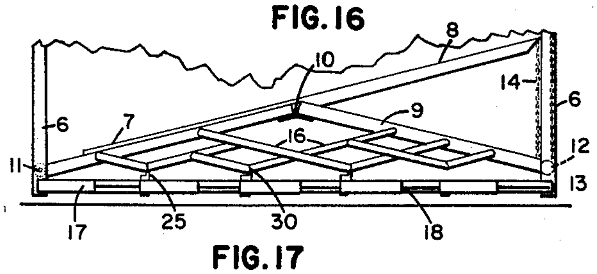

FIGURE 17 illustrates, by an elevational view similar to FIGURE 13, an attachment at tie rod and end points (of an additional modification of this invention) being a device for more positive control of the folding of the wall material, which would also be used opposite hand at the top of the frame.

Figures 18, 19, 20:
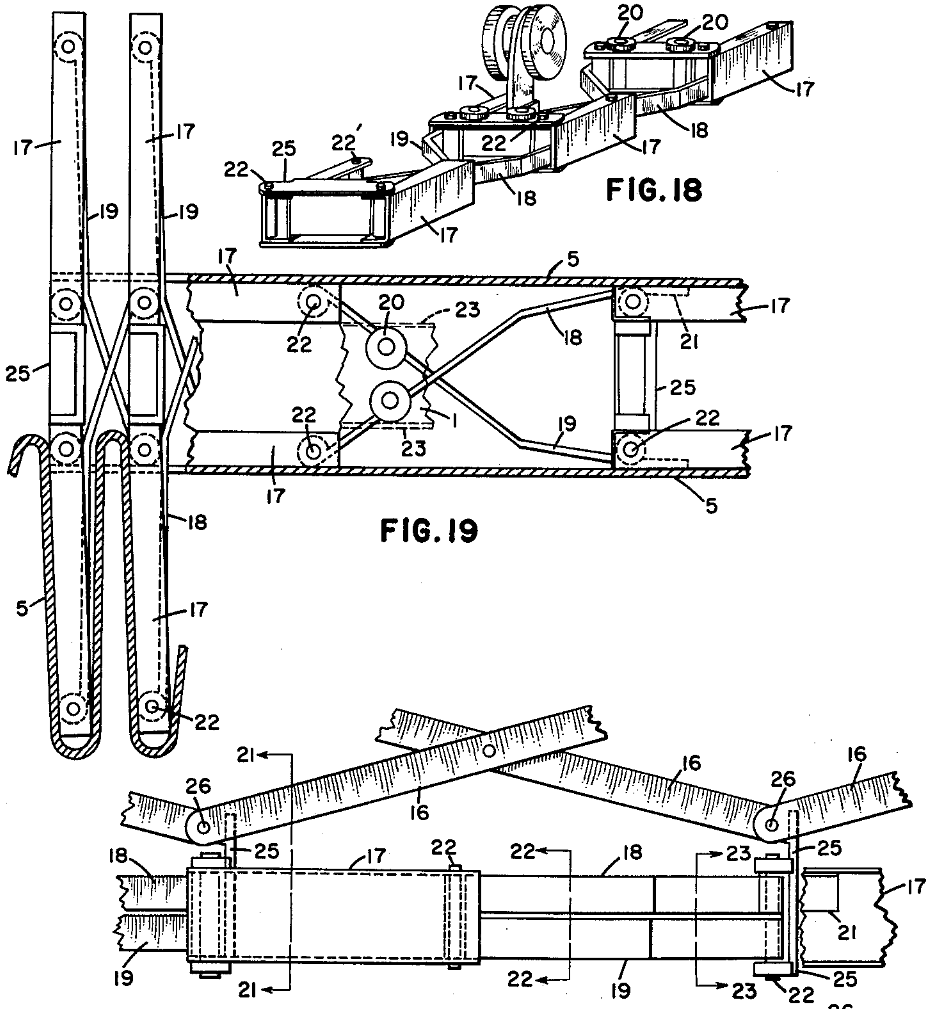

FIGURE 18 is an isometric view of this modification (which is a hinge device for area support and mechanical folding of the wall material).

FIGURE 19 is a plan view of three hinge sets of the device, showing two folded and one extended.

FIGURE 20 is an elevational view of one set of the hinge device, showing the support from criss-cross bottom collapsing member of the frame.

Figure 23:
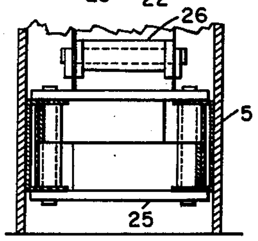
Figure 21:
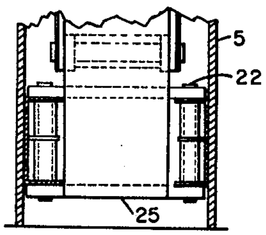
Figure 22:
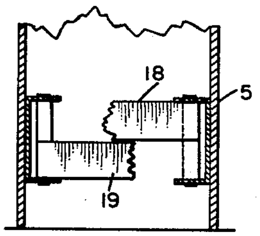

FIGURES 21, 22 and 23 are enlarged sectional details taken along lines 21—21, 22—22, and 23—23 of FIGURE 20.

Figure 24:
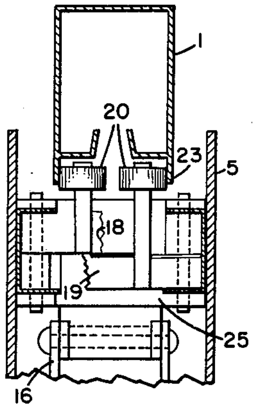
Figure 25:
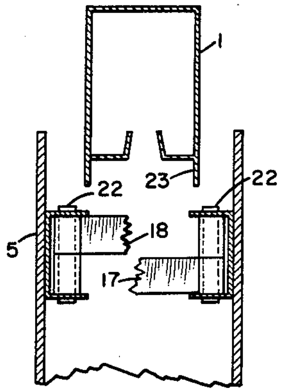
Figure 26:
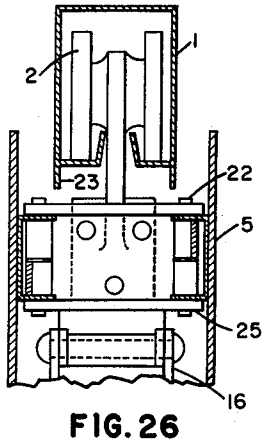
Figures 27, 28:
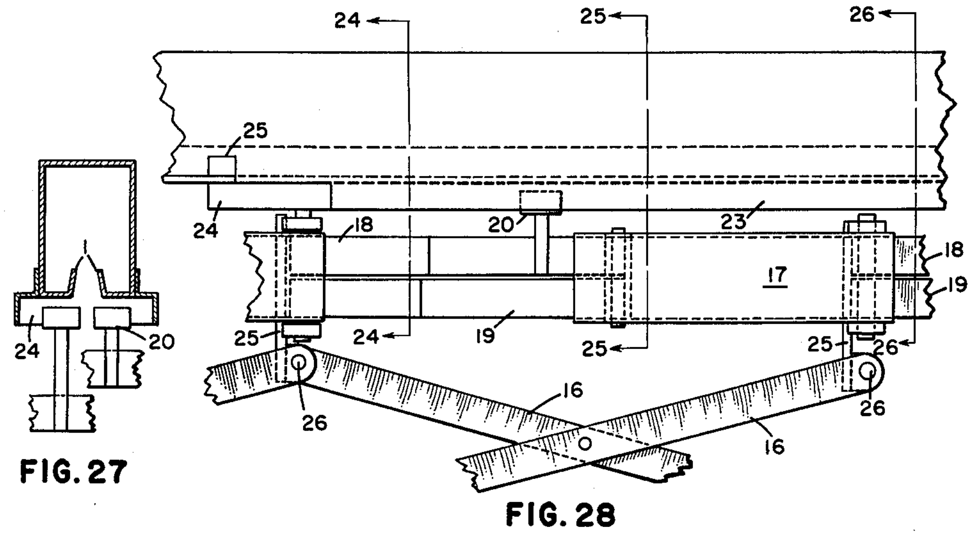

FIGURES 24, 25 and 26 are enlarged sectional views taken along lines 24—24, 25—25, and 26—26 of FIGURE 28.

FIGURE 27 is an end view of the modified device shown in FIGURE 28 illustrating how the hinges are held in line with the track when the frames are extended, by the use of rollers integral with parts of the device (acting to be contained within the lower lips of track.)

FIGURE 28 is an elevational view showing one hinge set of the device in extension and rollers within the track lips, and illustrates the support by means of hinge brackets from the criss-cross frame member at the tie rod points.

Figure 29:
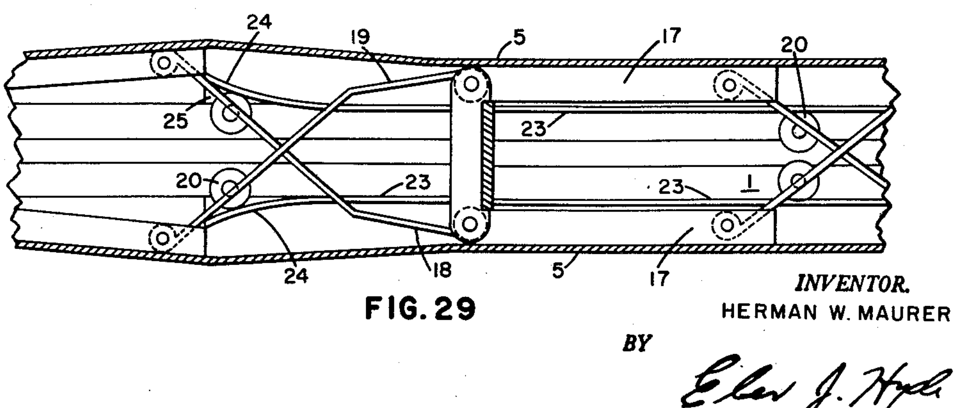

FIGURE 29 is a view looking up underneath the device shown in FIGURE 28, showing splayed termination of the track lips (to permit escape of the rollers from containment to allow folding at desired positions).

The devices of the present invention provide a folding partition consisting usually of a series of successive collapsible frames, each having two walls of fabric, plastic, or combinations of pliable materials, and having within the two walls a mechanism for folding the walls in accordionlike folds during collapsing of the frame, and mechanism for straightening out the folds to any degree of folding, and finally if desired, into two drumlike taut walls which are smooth surfaced from side to side and top to bottom, when the partition is in extended position. Each frame collapses or extends individually in planned succession to completion of operation in either direction.

Provision is shown for operation of a partition using one of the devices which is part of the invention, without the use of collapsible frames as folding mechanism, by substitution of other means of accomplishing the tautness of the walls when extended and pleating when folding.

Figure 1:
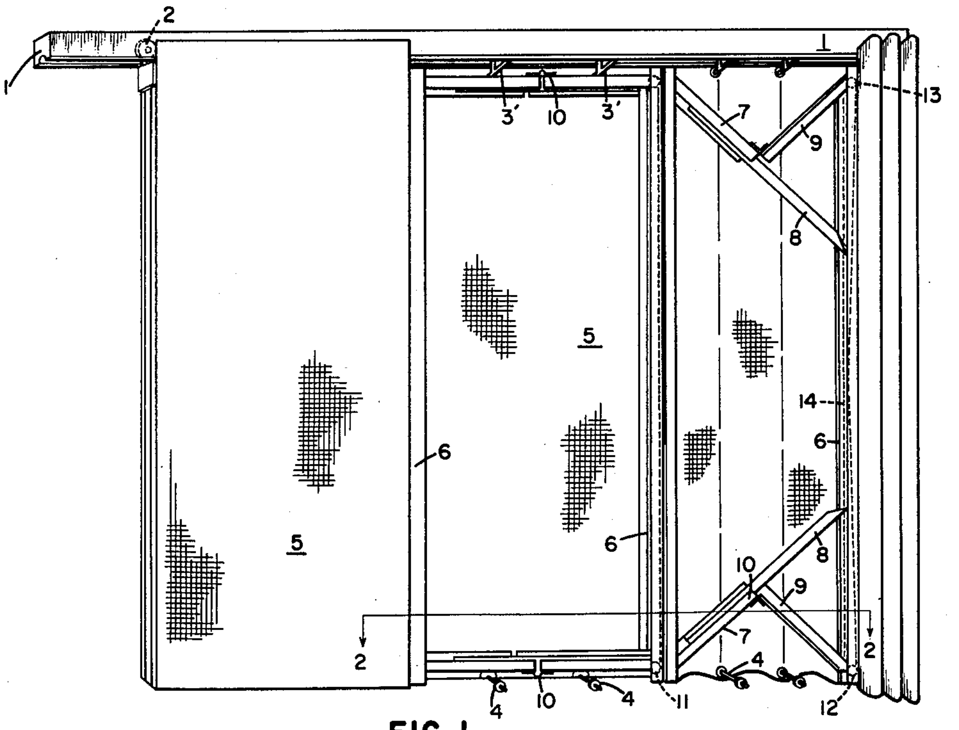
FIGURE 1 is an isometric view, with portions broken away, showing four successive frames in series, composing such a partition, in different degrees of folding or extending, and showing one method of stretching the walls to tautness in all directions.

In its simplest form, shown in FIGURES 1 to 10, the partition comprises a plurality of collapsible frames, each of which has two vertical posts suspended from a ceiling track, with top and bottom collapsing frame members between. As shown in FIGURE 1 the partition consists of a series of four such frames integrally adjoining each other, the left hand one being shown in extended or taut condition; the next one the same with the front wall surface removed; the next frame being shown in partially folded condition with its front wall surface removed; and the right hand frame being shown in completely folded condition.

As shown in FIGURE 1, a track 1 is secured to the ceiling of a room. The track may consist of an inverted U-shaped channel, and within the channel are mounted a plurality of wheeled primary trolleys 2 which can roll along the treads of track 1, carrying with them the posts of the frame to expand or contract the partition. The posts extending downwardly from the primary trolleys 2 are vertical frame members 6, one on each side of each frame. In a series of frames comprising the partition, adjoining posts are joined together with one trolley acting for the pair, after the two spaced apart walls 5 are cemented to the outside faces of the posts 6, with the frame members serving as spacers to maintain the two walls 5 spaced apart a uniform, appreciable distance to improve the sound insulating properties of the partition. This joining back to back of the posts serves also to stiffen the partition against outside impacts.

Between the posts 6 and at the top and the bottom of them and hinged oppositely, are collapsing frame members 7 and 9 hinged to each other in the middle at 10, of the frame, and with cantilever 8 which is integral with 7, and these collapsing members complete the frames. At regularly spaced intervals along the bottom edges of walls 5 are tie rods 4, and along the top edges are tie rods 3', which are integral or suspended from secondary trolleys 3, which roll in the same track as the primary trolleys 2.

Figure 2:
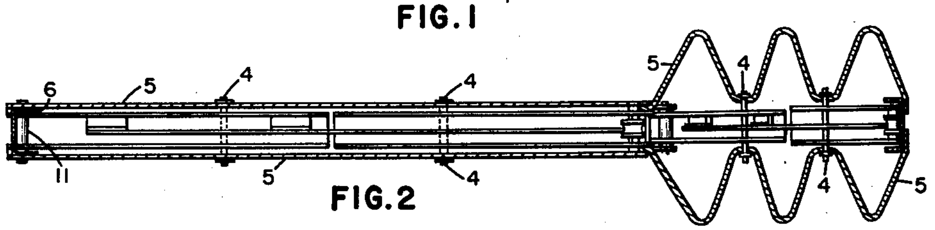
FIGURE 2 is a sectional plan view taken along line 2—2 of FIGURE 1 showing two of the four frames, one partially folded.
Figure 9:
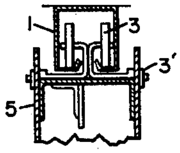
FIGURE 9 is a vertical cross section taken along line 9—9 of FIGURE 1, showing the top wall tie rods as part of secondary trolleys.
Figure 3:
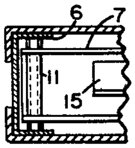
FIGURE 3 is an enlarged sectional plan view showing the left hand portion of the first frame of FIGURE 2, showing hinge pin and separators between frame members.
Figure 4:
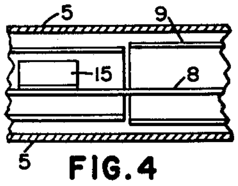
Figure 5:
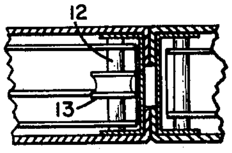
FIGURE 5 is an enlarged sectional plan view of the right hand portion of the first frame of FIGURE 2, showing the pin, separator, and pulley connection between frame members.
Figure 6:
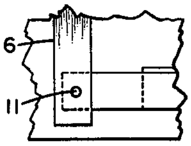
FIGURES 6, 7 and 8 are elevational views of the portions shown in FIGURES 3, 4, and 5.
Figure 7:
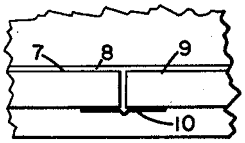
Figure 8:
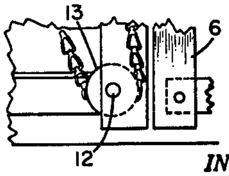
Figure 10:
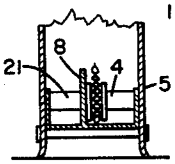
FIGURE 10 is a vertical cross sectional view taken along line 10—10 of FIGURE 1, showing lower joint.
Figure 12:
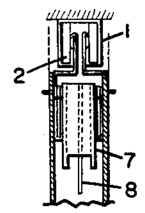
FIGURE 12 is a sectional view taken along line 12—12 of FIGURE 11, showing frame support by primary trolley to ceiling track.

As shown in FIGURES 9 and 10 each tie rod extends through each of the spaced walls 5, and thus serves to hold the two walls fixedly apart, but as shown at the right-hand end of FIGURE 2 the tie rods prevent the walls from extending away from each other as the frame collapses, thereby permitting the pressure of the imprisoned air between the walls to increase with the collapsing action of the frame and force the surfaces 5, 5 to adopt spaced accordion-like folds. The tie rods 4 at the bottom of the frame may be of heavier material than the top ones, or may be counterweighted in order to hold down the lower edges of the walls 5, 5 during folding. Also the internal frame members at top and bottom, 7, 8, and 9, have provisions for exerting onto the respective tie rods at top and bottom, 3' and 4, forces directed up and down when the frame is in extended condition, thus forcing the walls 5, 5 into a taut condition in a vertical as well as horizontal direction. Frame members 7, 8, and 9 form, in effect, a snap-action joint by having the middle hinge pin 10, positioned slightly inwardly from the line of the outer pins 11 and 12. As shown in FIGURE 1, the arms 7 and 9 are hinged together at the middle of the frame by pin 10 and cantilever 8 is an integral extension of arm 7 positioned beyond the joint to cantilever freely over arm 9. The end of the member 7 which is opposite the hinge point 10 is hinged to one post 6 of the frame by means of a pin and separator connection 11, and the end of member 9, spaced away from the hinge point 10, is hinged to the other opposite post 6 of the same frame by the pin, separator and pulley connection 12. A pulley 13 is mounted around the connection 12, and a chain or cable 14 extends around the pulley. Two of these collapsing cantilever units 7, 8, and 9 are utilized, one at the top of each frame and one at the bottom, and as shown at the right hand side of FIGURE 1, the top unit is upside down compared to the bottom unit so that in both instances the cantilever 8 extends inwardly toward the center of the frame as it collapses to fold the partition unit. One end of the chain 14 is connected to one end of the bottom cantilever 8 and extends up over and around the upper pulley and down to the top cantilever 8; and a second portion of the chain is connected to one end of the top cantilever 8 and extends down under and around the lower pulley and then up to the bottom cantilever 8, to form a continuous circuit. This serves to make the top and bottom cantilever units operate together, and keeps the posts 6, 6 vertical and parallel. The bottom members 7, 8 and 9 are made of heavier material than the corresponding top ones in order to establish in each frame a biasing force which tends to keep the frame in extended condition subject only to the force required to fold the unit. The third frame from the right of FIGURE 1 shows the opposite side fabric in its taut condition, with the near-side wall removed to show the frame; the upper and lower members 7, 8 and 9 being horizontally straight. The means of starting collapsing of the frame against the snap action are not shown here, and are not a part of this invention. It is evident that as the frame collapses, the primary trolleys approach each other, forming folds in the walls between tie rods of that frame.

The device shown and described in FIGURES 1 to 10 is quite inexpensive and operates to meet many requirements efficiently; however, in some installations it is desirable to exert more positive control to obtain uniformity of pleats during folding of the frame, and for heavy wall materials to be better balanced and controlled during the operation; as in the case in rooms of high ceiling as auditoriums, school rooms, etc. Here it is important to reduce the frictional and other interference forces particularly at the secondary trolleys additionally operating in the track.

To meet these further requirements an additional embodiment of the invention is shown in FIGURES 11 to 17, to illustrate a device which achieves these ends, while maintaining the highly desirable tautness of the walls 5, 5, and freedom from top to bottom collapsing members, of any intervening constructive parts. As in the previous embodiment, there is a track 1 secured to the ceiling, and a pair of trolleys 2, 2 for each frame operating within the track. Vertical frame members 6, 6 are hung from the trolleys 2, 2, and they extend down to a position near the floor. One end of collapsing member 7 is hinged at 11 to vertical frame member 6 and the other end is hinged at point 10 to one end of collapsing frame member 9. The opposite end of frame member 9 is hinged at 12 to the other vertical frame member 6. Cantilever 8, integral with member 7, overlies collapsing frame member 9 to be connected with chain 14, all as previously described. However, the collapsing members 7, 8 and 9 are shown not to continue to snap action horizontal position, but with frame in partially collapsed condition, at the completely extended condition of the frame, at which the wall surfaces 5, 5 are taut.

Figure 11:
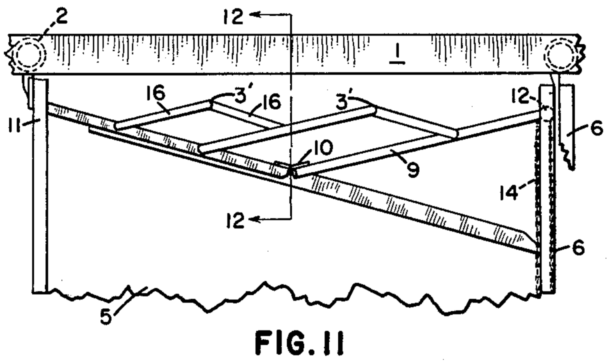
FIGURE 11 is an elevational view of another embodiment of the invention wherein secondary trolleys are replaced for two tie rods by a criss-cross member acting as part of the top collapsing member of the frame.
Figure 14:
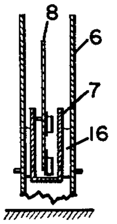
FIGURE 14 is a cross sectional view taken along line 14—14 of FIGURE 13.

FIGURE 11 illustrates a typical top member 7, 8 and 9 in partially collapsed condition of the frame, at which position the walls would be taut, and held so from post 6 to post 6, by the excess weight of the bottom member 7, 8, 9 over the top one. To and between members 7 and 9 are hinged wall locating means such as criss-cross bars 16 on each side, forming in effect, a pantograph movement of upper hinged joints 3′ acting as tie rods which extend from one side to the other, and correspond to the tie rods 3′ of FIGURE 1 but without suspension from the track by secondary trolleys 3. The two tie rods or joints 3′ shown always stay in a horizontal line defined by hinge points 11 and 12, this line being the base of a triangle, within which criss-cross bars operate, instead of the usual center line used in the trade for such a line in pantograph controls.

FIGURE 13 illustrates a typical bottom portion, but differs in that there are four tie rod points 4′ which correspond to tie rods 4 shown in FIGURE 1. As in the embodiment shown in the first sheet, the bottom portion is inverted from the upper, and here is in partially folded position corresponding to the upper shown in FIGURE 11, with a like system of criss-cross bars acting as a pantograph unit to keep points 4′ always in horizontal alignment with points 11 and 12. The ends of cantilevers 8, 8 are likewise attached to chain circuit as on the first sheet. It will be appreciated that as the frame is opened or closed, all the points 11, 4′, 4′, 4′, 4′, and 12 must maintain uniform spacing with respect to each other, and thus very accurate and uniform control of uniformity of folds within the frame obtains at all stages of folding. It is evident that by eliminating the secondary trolleys, and with all the weight on the primary trolleys 2, there is a considerable reduction of resistance to folding. This is especially true when the partition consists of a large number of frames in series and most or all of the frames are in extended condition. It is also evident that the pantograph action in aligning points 4′, at all stages of folding, also maintains a tautness of wall fabric between the upper point 3′ and its corresponding lower point 4′ along a vertical line of the wall material, eliminating the need of counterweighting the lower tie rods as in the previously described simplest form. FIGURES 15, 15*a*, and 15*b* show how the wall material may be cemented to the backs of the posts 6 and fixedly spaced from each other through grommets of the wall at the tie rods.

The embodiment thus described and shown in FIGURES 11 to 17 is still a relatively inexpensive one to manufacture, and easy to operate in largest units. However, there are still instances where better and more adequate support of the walls than at points, top and bottom, are required; and where more mechanical formation of the pleats, and still more uniform control of them are desirable for partitioning large gymnasiums, or other purposes where the partitions are subject to unusually rough usage.

To meet these, a further embodiment of the invention is shown in FIGURES 17 to 23, and basically utilizes the pantograph type of motion which was previously described, but instead of the wall being connected at the several points 3′ and 4′, it is area connected to top and bottom members of a plurality of pairs of hinges 17, activated by push rods 18 and 19; the hinges being supported by brackets 25, which are hinge connected to the tie rods 3 and 4′ at the intermediate points; and are integral with the posts 6 at the ends, as is shown in elevational view in FIGURE 17. The top hinge system is of course inversely positioned with respect to the pantograph system as compared with the bottom one. FIGURE 18 shows independently such a system of two sets in a series. Each hinge set comprises two hinges 17, hinged opposite each other at 22 of the supporting bracket 25; and push rods 18, 19 hinged on opposite sides of the same bracket, are directed to point 22′ on the adjoining hinge of the opposite side, in such a manner that when the hinge brackets 25 approach each other, the hinges 17 are forced away from each other, to fold the walls outwardly along a line at right angles to the longitudinal extended position of the hinge system. Each hinge leaf 17, being channel shaped, presents a broad vertical face area toward the outside to which walls 5, 5 may be cemented or otherwise affixed in total length, providing ample means for supporting heavy wall materials for vertical stretching from top to bottom, and this part of the wall, part of any fold when folding, remains a rigid surface; leaving the remaining intervening part to the next hinge leaf, unsupported and free to assume any condition to complete the folding pleat. It is to be noted that this combination of hinges and activating push rods throughout the folding does provide enough unrestricted wall material throughout the folding to avoid any restriction against folding. A series of such hinge combinations supported on the pantograph top member and the bottom member, operating with cantilevers 8, and chain 14, operate the folding and extension of each frame as with previous embodiments; but further, the shafts of rollers 20 shown in FIGURES 18, 19, 24, 27, 28 and 29 are attached to the push rods 18, 19 and act to hold the hinge faces of 17 in extended alignment, and the walls taut, by being forced to roll inside of the lower lips 23 of the track in which the rollers operate, except at the end folding position shown in FIGURES 27, 28 and 29, where the lips 23 terminate in a splayed outlet and inlet 24 for the rollers, and beyond which the rollers no longer restrain the push rods 18, 19 from folding the hinges. FIGURE 18 shows the rollers on one set of push rods 18, 19, but it is to be understood that there may be a pair on each pair of push rods.

It is evident that a slight thrust on the end of a series of hinge sets will force the hinge 17 outwardly from each other when they are not restrained by rollers 20 being held within the track lips 23. It is also evident that the bracket 25 hinge points 30 being equally spaced by pantograph, will cause any number of hinges between posts 6 to act in unison in either extension or folding.

The vertical posts 6, which carry the entire load, are directly suspended from the track at the ceiling, and with intermediate pantograph support, keep all parts in track alignment during all stages of folding at the top; and to obtain rigidity at the bottom, at full extension of the partition, against wind pressure, or kicking and falling against, the bottom of all posts may be fitted with floor bolts; so that as at the top, the bottom pantograph members and hinges also serve to keep the bottom in alignment with the track. For this purpose in connection with similar frames automatic engagement has been used, and their use in connection with this or previous embodiments of this invention, are a further embodiment of it.

This use of automatic floor engagement at the bottom of the posts is an important embodiment, as movement of the posts is always in alignment with the track and sliding into and out of floor slots comes with to and fro movement to and away from them. In usual fabric covered partitions the supports from top to bottom are at the toe of the folds, and during folding movement of the bottom rods is laterally radial, complicating the use of any floor connections here. Then too, such rods top to bottom add much weight, and force of folding must move the rods of each pleat. The hinge system shown eliminates such intervening top to bottom members except at posts which are very stiff against any lateral force.

Another valuable feature is the elimination of numerous trolleys of the usual partition by the use of the pantograph means of support of the walls.

Still another feature of the invention is to connect the top and bottom pantograph devices together by chain or other evident means, thereby constraining the top and bottom portions to fold or unfold together in always vertical folds or pleats, and always together, without regard to height of operating handle and point of folding force. To illustrate another means, a roller at the end of cantilevers rolling along a vertical line between top and bottom hinge points 12, 12, and within a restraining track integral with post 6 would also, though less aptly, accomplish similar results, and when used in combination with the embodiments of this invention are part of it.

Still another feature of the invention is that this hinge and cross-push-rod system of folding and forming the folds which accomplishes all the purposes of the usual hinge systems of accordion folding partitions known to the trade, and additionally, supports the wall fabric on an area basis, top and bottom only, and which shapes the folds from a straight taut condition of the walls to a fully folded packed condition. It is also to be noted that such a system of continuous hinges, suspended slidably from a ceiling track to periodic brackets and with walls on each side likewise attached to the hinge faces, and with these walls extending to the floor, like a double partition on top, could hang like curtains at the bottom, and at points beneath the horizontal hinge points of the brackets above, with the tie rods shown at the bottom of FIG. 1, in the present case also tend to hold the heel or inner turns of the folds in vertical alignment, further promoted by counterweights on the tie rods and the weight of the wall material additionally, and curtains of this type hung from the partition type series of horizontally swinging hinges herein described, is an individual part of this invention.

It is obvious that completely different as the described system of hinges is, it would easily lend itself for use in a folding partition otherwise very similar to those of the trade, by hanging the upper system at periodic perhaps alternate brackets 25 by attached primary trolleys 2 rolling in the ceiling track, and suspending the bottom system of hinges 17, and cross push rods 18, 19 with their bracket supports, from rods 28 or like members extending from top points 22′ to bottom points 22′ as is illustrated in FIGURE 30*a*. It is evident that the rod 27 or like members could likewise extend from top to bottom points 22 of the bracket 25 as shown in FIG. 30*a* or that instead of being rods so suspended, post members 26 could be used to attach upper with lower alternate or periodic brackets 25, as shown in FIG. 30*a* with or without the use of rods at 22′. Such a partition would be similar in appearance and folding to the previously described ones but with the top and bottom collapsing members of the frames omitted, would depend only on the rollers 20 to keep the walls taut at extension.

In such partitions with elimination of the frames, occasion might not require that the wall surfaces be perfectly taut, leaving possible the slightest suggestion of fold even at extension; in which case the lower lips 33 of the track 2, and the rollers 20 mounted by shafts to 18, 19 would be omitted, and a lug extension 21 of push rods, 18, 19 shown in FIGURES 19 and 20 positioned inside the inner web surfaces of hinge channel 17 would, as the push rods cross each other inwardly, start hinges 17 on each side of brackets 25 to swing outwardly to form the folds, and from the very start transfer the folding action from an initial hinge set to successive ones quite simultaneously all along the line of the track, instead of folding those only within each frame, and oppositely, unfold the folds to near tautness of walls at extension. There are known to the trade numerous ways of keeping such folds vertical, which used in conjunction with the described hinge sets, are to be regarded as an individual part of this invention.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a foldable partition panel for a building, a plurality of foldable, pliable walls which in their extended condition lie smooth, parallel, and spaced apart from each other, an overhead track to be secured to said building, primary trolley means supported by said track, first and second vertically extending, parallel frame members one at each end of said panel, means connecting each of said frame members to said trolley means, means securing said pliable walls to said vertically extending frame members for supporting said walls from said overhead track, tie rod means connected through said foldable pliable walls along the top and bottom edges thereof and spacing said walls apart, and a pair of collapsing frame members located between said walls one at the top edge thereof and the other at the bottom edge thereof and each hinged to both of said vertically extending frame members for forcing said frame members apart to establish horizontal tautness in said pliable walls as said panel is extended, at least one of said collapsing frame members when it is in its extended position pressing outwardly against said tie rod means provides vertical tautness in said walls.

2. In a foldable partition panel for a building, a plurality of foldable, pliable material walls which in their extended condition lie smooth, parallel and spaced apart from each other; an overhead track to be secured to said building; primary trolley means supported by said track; first and second vertically extending, parallel frame members one at each end of said panel; means connecting each of said frame members to said primary trolley means; means securing said pliable walls to said vertically extending frame members for supporting said walls from said overhead track; tie rod means connected through said foldable pliable walls along the top and bottom edges thereof for spacing apart said walls at the top and at the bottom; and a pair of collapsing frame members located between said walls one at the top edge thereof and the other at the bottom edge thereof and each being hinged to both of said vertically extending frame members for forcing said frame members apart to establish horizontal tautness in said pliable walls when said panel is extended, and by said pair of collapsing frame members pressing upwardly and downwardly, respectively, against said top and bottom tie rod means when said panel is extended to establish vertical tautness in said pliable walls.

3. A foldable partition panel as set forth in claim 2, further characterized by said tie rod means through the top edges of said walls comprising secondary trolleys mounted for sliding movement on said overhead track whereby said secondary trolleys support said pliable walls while said walls are being folded and unfolded.

4. A foldable partition panel as set forth in claim 3, further characterized by said two spaced apart walls, said top and bottom tie rod means and said vertical frame members defining an enclosure sufficiently air tight that as the panel is folded the air between the walls forces out the pliable walls at locations between the tie rods, thereby promoting the folding action of the pliable walls.

5. A foldable partition panel as set forth in claim 4, further characterized by chain means interconnecting said two collapsing frame members constraining them to operate in unison as said panel is folded or unfolded.

6. A foldable partition panel as set forth in claim 5, further characterized by said lower collapsing frame member including an unbalanced cantilevered arm to which said chain means is connected, the unbalanced weight of said cantilevered arm arm exerting biasing forces on said pliable walls tending to maintain said walls taut.

7. In a foldable partition panel for a building, a plurality of foldable, pliable walls which in their extended condition lie smooth, parallel, and spaced apart from each other, an overhead track to be secured to said building, primary trolley means supported by said track, first and second vertically extending, parallel frame members one at each end of said panel, means connecting each of said frame members to said trolley means, means securing said pliable walls to said vertically extending frame members for supporting said walls from said overhead track, tie rod means connected to said foldable pliable walls along the top and bottom edge thereof and spacing said walls apart, a pair of collapsing criss-cross frame members located between said walls one at the top edge thereof and one at the bottom edge thereof and each hinged to both of said vertically extending frame members for forcing said frame members apart to establish horizontal tautness in said pliable walls as said panel is extended, means connecting said tie rods to said criss-cross frame members whereby said pliable walls are supported therefrom at equally spaced intervals which are always horizontally aligned and parallel to said overhead track.

8. In a foldable partition panel for a building, a plurality of foldable, pliable material walls which in their extended condition lie smooth, parallel and spaced apart from each other, an overhead track to be secured to said building, a series of foldable top hinge sets including rollers and roller limiting lips, each of said sets comprising a pair of hinge leaves and interconnecting actuating cross-bars, trolley means supporting said hinge sets from said track, and means connecting said pliable walls to said hinge sets for folding said walls into a corrugated, packed condition as said hinge sets fold, said roller limiting lips engaging said rollers to prevent said actuating cross-bars from folding outwardly when said wall is in its taut condition.

9. A foldable partition panel as set forth in claim 8, further characterized by top and bottom tie rod means connected to said pliable walls and by criss-cross lever means connected to said hinge sets, said hinge sets being located between said tie rods, and said criss-cross lever members holding said tie rods in an extended condition when said panel is taut.

References Cited in the file of this patent

UNITED STATES PATENTS

| | | |
|---|---|---|
| 1,460,597 | Maurer | July 3, 1923 |
| 1,698,746 | Veeder | Jan. 15, 1929 |
| 2,732,894 | Harris | Jan. 31, 1956 |